(12) United States Patent
Bierwirth et al.

(10) Patent No.: US 10,960,846 B2
(45) Date of Patent: Mar. 30, 2021

(54) INFLATOR, METHOD OF MANUFACTURING THE SAME AND MODULE INCLUDING SAID INFLATOR

(71) Applicant: ZF Airbag Germany GmbH, Aschau am Inn (DE)

(72) Inventors: Sebastian Bierwirth, Rechtmehring (DE); Achim Hofmann, Tuessling (DE); Hans-Peter Neumayer, Ampfing (DE); Dieter Spitzenberger, Kraiburg (DE); Franz Fuerstenberger, Taufkirchen (DE); Hannes Nuiding, Muehldorf am Inn (DE); Dieter Leier, Haag (DE); Georg Schoenhuber, Oberneukirchen (DE); Joerg Friedrich, Munich (DE)

(73) Assignee: ZF AIRBAG GERMANY GMBH, Aschau am Inn (DE)

( * ) Notice: Subject to any disclaimer, the term of this patent is extended or adjusted under 35 U.S.C. 154(b) by 0 days.

(21) Appl. No.: 16/796,974

(22) Filed: Feb. 21, 2020

(65) Prior Publication Data
US 2020/0238945 A1 Jul. 30, 2020

Related U.S. Application Data

(62) Division of application No. 15/677,136, filed on Aug. 15, 2017, now Pat. No. 10,589,709, which is a
(Continued)

(30) Foreign Application Priority Data

Sep. 30, 2008 (DE) .......................... 102008049650.2
Sep. 30, 2008 (DE) .......................... 102008049652.9

(51) Int. Cl.
*B60R 21/264* (2006.01)
*B60R 21/26* (2011.01)

(52) U.S. Cl.
CPC ........ *B60R 21/264* (2013.01); *B60R 21/2644* (2013.01); *B60R 2021/26029* (2013.01); *B60R 2021/26076* (2013.01)

(58) Field of Classification Search
CPC .............. B60R 21/264; B60R 21/2644; B60R 2021/2648; B60R 2021/26029; B60R 2021/26076
(Continued)

(56) References Cited

U.S. PATENT DOCUMENTS 3,877,882 A * 4/1975 Lette ................... B60R 21/2644
422/164
4,590,041 A 5/1986 Hill
(Continued)

FOREIGN PATENT DOCUMENTS

EP 0864469 A2 * 9/1998
EP 0943503 9/1999
(Continued)

*Primary Examiner* — Ruth Ilan
(74) *Attorney, Agent, or Firm* — Tarolli, Sundheim, Covell & Tummino LLP

(57) ABSTRACT

An inflator as well as a method of manufacturing an inflator, a module including an inflator and an airbag module. In an inflator, especially for a protective device in a vehicle, comprising plural components a sealant is applied in the area of abutting components, especially a sealant which adheres to both abutting components.

20 Claims, 6 Drawing Sheets

Related U.S. Application Data division of application No. 14/834,643, filed on Aug. 25, 2015, now abandoned, which is a division of application No. 12/997,615, filed as application No. PCT/EP2009/006988 on Sep. 29, 2009, now Pat. No. 9,139,156.

(58) Field of Classification Search
USPC .................................................. 280/741
See application file for complete search history.

(56) References Cited

U.S. PATENT DOCUMENTS

| | | | |
|---|---|---|---|
| 5,100,171 A | | 3/1992 | Faigle et al. |
| 5,131,679 A | | 7/1992 | Novak et al. |
| 5,178,547 A | | 1/1993 | Bonas et al. |
| 5,241,910 A | | 9/1993 | Cunningham et al. |
| 5,468,012 A | * | 11/1995 | Mihm .................. B60R 21/201 280/728.2 |
| 5,503,426 A | * | 4/1996 | Lang ...................... B21D 39/03 280/728.2 |
| 5,518,266 A | | 5/1996 | O'Docherty et al. |
| 5,542,693 A | | 8/1996 | Koide |
| 5,558,366 A | | 9/1996 | Fogle, Jr. et al. |
| 5,803,494 A | * | 9/1998 | Headley ................ B60R 21/264 280/736 |
| 5,932,832 A | | 8/1999 | Hansen et al. |
| 6,315,322 B1 | * | 11/2001 | Mika ................... B60R 21/2644 280/736 |
| 6,431,582 B1 | | 8/2002 | Ennis et al. |
| 6,557,902 B1 | * | 5/2003 | Einsiedel ............... B60R 21/26 222/3 |
| 6,709,004 B1 | | 3/2004 | Judd et al. |
| 6,718,884 B1 | | 4/2004 | Yabuta et al. |
| 6,749,219 B2 | | 6/2004 | Edwards, II et al. |
| 7,104,569 B2 | | 9/2006 | Goetz |
| 7,373,204 B2 | | 5/2008 | Gelfand et al. |
| 7,390,019 B2 | * | 6/2008 | Gotoh ................. B60R 21/2644 280/736 |
| 7,934,749 B2 | * | 5/2011 | Burns ................. B60R 21/2644 280/741 |
| 8,297,652 B2 | * | 10/2012 | Tauchen ................ B60R 21/264 280/741 |
| 8,820,783 B1 | * | 9/2014 | Thompson .......... B60R 21/2644 280/741 |
| 9,643,565 B1 | * | 5/2017 | Henck .................. B60R 21/264 |
| 2001/0001523 A1 | * | 5/2001 | Green, Jr. ............ B60R 21/2644 280/736 |
| 2002/0144621 A1 | * | 10/2002 | McFarland ......... B60R 21/2644 102/530 |
| 2003/0178828 A1 | * | 9/2003 | Rink ...................... B60R 21/26 280/741 |
| 2005/0121894 A1 | | 6/2005 | Brisighella, Jr. et al. |
| 2006/0207459 A1 | | 9/2006 | Nishina |
| 2006/0254454 A1 | * | 11/2006 | Bierwirth ............ B60R 21/2644 102/530 |
| 2007/0023137 A1 | | 2/2007 | Merz |
| 2007/0046005 A1 | * | 3/2007 | Hanano ............... B60R 21/2644 280/736 |
| 2007/0063494 A1 | | 3/2007 | Saito et al. |
| 2007/0120349 A1 | * | 5/2007 | Hoffman ............. B60R 21/2644 280/741 |
| 2007/0222195 A1 | | 9/2007 | Yabuta et al. |
| 2007/0228013 A1 | * | 10/2007 | Stevens .................. B60R 21/26 218/1 |
| 2007/0273132 A1 | | 11/2007 | Smith et al. |
| 2008/0022880 A1 | | 1/2008 | Bierwirth et al. |
| 2008/0129027 A1 | * | 6/2008 | Nakayasu ................. F42B 3/24 280/741 |
| 2009/0091110 A1 | * | 4/2009 | Nakayasu ........... B60R 21/2644 280/741 |
| 2009/0115175 A1 | * | 5/2009 | Nishimura .......... B60R 21/2644 280/741 |
| 2010/0071580 A1 | * | 3/2010 | Nakayasu ............. B60R 21/261 102/530 |
| 2010/0186616 A1 | * | 7/2010 | Reichelt .............. B60R 21/2644 102/530 |

FOREIGN PATENT DOCUMENTS

| | | | | |
|---|---|---|---|---|
| EP | 1227016 | | 7/2002 | |
| EP | 1447641 | | 8/2004 | |
| EP | 1621413 | | 2/2006 | |
| EP | 1702814 | | 9/2006 | |
| EP | 1721789 A1 | * | 11/2006 | ......... B60R 21/2644 |
| EP | 1837253 | | 9/2007 | |
| JP | 60129224 | | 7/1985 | |
| JP | 6119320 | | 1/1986 | |
| JP | 6163445 | | 4/1986 | |
| JP | 23163 | | 1/1990 | |
| JP | 639876 | | 6/1994 | |
| JP | 724391 | | 1/1995 | |
| JP | 10117116 | | 5/1998 | |
| JP | 10119705 | | 5/1998 | |
| JP | 10181516 | | 7/1998 | |
| JP | 200152772 | | 2/2001 | |
| JP | 2001124498 | | 5/2001 | |
| JP | 2001260815 | | 9/2001 | |
| JP | 2001301561 | | 10/2001 | |
| JP | 2003161599 | | 6/2003 | |
| JP | 2004271030 | | 9/2004 | |
| JP | 2005186873 | | 7/2005 | |
| JP | 2005313121 | | 11/2005 | |
| JP | 2006085533 | | 3/2006 | |
| JP | 3134430 | | 7/2007 | |
| WO | 9610495 | | 4/1996 | |
| WO | 0131282 | | 5/2001 | |
| WO | 0151193 | | 7/2001 | |
| WO | WO-2007037360 A1 | * | 4/2007 | ......... B60R 21/2644 |

* cited by examiner

INFLATOR, METHOD OF MANUFACTURING THE SAME AND MODULE INCLUDING SAID INFLATOR

RELATED APPLICATIONS

This application is a divisional of U.S. patent application Ser. No. 15/677,136, filed Aug. 15, 2017, which is a divisional of U.S. patent application Ser. No. 14/834,643, filed Aug. 25, 2015, which is a divisional of U.S. patent application Ser. No. 12/997,615, filed Dec. 13, 2010, now issued as U.S. Pat. No. 9,139,156 on Sep. 22, 2015, which is a National Phase filing of PCT/EP2009/006988, filed Sep. 29, 2009, which claims priority from German Application Nos. 102008049650.2, filed Sep. 30, 2008 and 102008049652.9, filed Sep. 30, 2008, the subject matter of which are incorporated herein by reference in their entirety.

FIELD OF THE INVENTION

The invention relates to an inflator, especially for a protective device in a vehicle, a module equipped with an inflator as well as an airbag module. Further, the invention relates to a method of manufacturing an inflator, especially for controlling the tightness of an inflator.

BACKGROUND OF THE INVENTION

Gas generators or inflators for protective devices in a vehicle drive e.g. parts (propping up of hoods, tensioning of the belt, shifting of cushions or the like) or inflate airbags.

Inflators must be operable for many years for singular use, that is, they may be exposed to high requirements in terms of stability to environmental influences such as penetration of moisture or corrosion.

Inflators consist of several interconnected parts. Between abutting parts a reliable connection lasting for many years is required as protection against environmental influences from outside.

SUMMARY OF THE INVENTION

In accordance with an aspect of the invention, an inflator is provided especially in accordance with the type described above and/or hereinafter in which in the area of abutting parts a sealant is applied to the parts, especially a sealant adhering to both abutting parts. Said sealant preferably is an additional agent serving for the tightness which is not the only connecting means between the abutting parts.

The sealant preferably adopts no mechanical or adhesive holding function between the abutting parts which are interconnected otherwise. That is to say, even without a sealant the inflator is designed such that the abutting parts are fixed in position.

As the sealant adheres to both abutting parts, moisture is prevented from penetrating the interior of the inflator.

The abutting parts to which the sealant is applied form at least part of the outer inflator surface and/or are especially made of different materials. The preferred embodiment provides that one part is made of plastic material and the other is made of metal. Due to the strongly different expansion coefficients and properties of these parts, the invention provides an optimized protection against environmental influences.

The part consisting of plastic material especially constitutes a partial injection-molding around the metallic component. Although such injection-molding also ensures a tight, even moisture-tight connection between these parts which, apart from the form closure, also permits adhesion, the sealant provides additional safety against environmental influences during the service life of an inflator, as it would be possible at least theoretically that in the course of time small gaps might occur by virtue of the different thermal expansions and the different expansion behavior.

It is mentioned in this context that inflators and thus the connection of the parts and the efficiency of the sealant have to reliably operate and act within a temperature range of at least –40° C. to at least 120° C. In order to fulfill these properties, the sealant exhibits high flexibility even with low temperatures. Further properties include low viscosity in the liquid state during application for penetrating micro-gaps, good wetting of the different surfaces and rapid hardening, where possible.

This rapid hardening can be obtained, for instance, by the fact that the sealant has to be applied in a liquid state and can subsequently be hardened by UV radiation.

As already mentioned before, the sealant is used especially between a plastic component and a metallic component in an inflator. A preferred embodiment is the additional sealing between a base of an igniter consisting of plastic material and the adjacent housing part of the inflator which is usually made of metal. The inflator according to the invention shows the sealant in the transition area between the base and the housing part.

The base can be formed by injection-molding around the metallic part.

Preferably, also a pre-fabricated igniter is embedded in portions of the base, which is effectuated especially during injection-molding.

Moreover, the base preferably forms a holder for the igniter plug, i.e. the igniter plug which is plugged onto the contact pins is held in the base itself.

The part consisting of metal can be an external housing part of the inflator. The sealant is applied to the parts from outside after they have already been interconnected and not during connection of the parts.

The part consisting of metal is injection-molded, for instance, to the edge of an orifice in the external housing part, especially for closing the latter.

The sealant is furthermore applied to the inflator preferably not extensively but only at the transition edge of the abutting parts. For protecting the sealant, the latter is introduced especially in a recess provided at the transition of the abutting parts. The sealant can fill the recess completely or almost completely. Preferably the sealant does not protrude outwardly vis-à-vis the recess. Especially the recess is formed by two abutting radii of the two neighboring parts which form a rolling V-shaped groove.

A preferred embodiment of the invention provides that the sealant is an adhesive, especially acrylate adhesive.

The preferred mechanical, chemical and physical properties of the sealant are stated in the claims, wherein it is emphasized that one or more of the stated properties should be given.

When applying the sealant it is important that it is applied to all required predetermined positions. In accordance with a preferred embodiment and in accordance with a method according to the invention it is provided that the sealant contains a dye, especially a fluorescent dye by means of which the extension of the sealant can be controlled. The color in the sealant should be clearly different from the color (if provided) of the plastic material of the part or, more generally, the parts to which the sealant is adjacent.

The extension of the application of the sealant can be checked even automatically via a camera, where appropriate.

When using a fluorescent dye the sealant, and more exactly speaking the bead formed by the sealant, is irradiated with UV light, which permits a particularly simple, fully automated control.

The invention provides, moreover or in addition to the afore-mentioned features, an inflator, especially according to the type described before and/or hereinafter, in which an excellent filtering effect is obtained. For this purpose, upstream of discharge orifices of the inflator an annular, preferably substantially cylindrical filter is provided in the inflator which has two axial ends. The filter extends outwardly bent, especially linearly bent at one of its axial ends. This bending of the filter, which is produced already during manufacture of the filter and not as late as during mounting by applying a tension force, imparts higher elasticity to the filter in the axial direction. In this way, the filter can adapt very well to its adjacent walls during mounting into the inflator and allows a safe, exactly predeterminable pre-tensioning force. Thus, it is ensured with the constantly present tolerances that the filter also contacts the walls and no clearances which might cause leakage flows occur between the filter and the adjacent wall.

In the bent portion the filter has especially the same thickness as in a central portion which is adjacent to the bent portion. This is to improve the elasticity and moreover is to reduce the constructed space and the weight. Moreover, when manufacturing the filter no longer the wire length and thus the mass has to be transported or integrated in a particular portion so that the bending can be simply brought about by a plastic deformation.

Preferably, the filter wall extends, viewed in axial cross-section, substantially S-shaped between the ends, wherein the bending is part of the "S". This, too, is to serve for increasing the elasticity. The S-shape relates to the built-in state in which the filter is positioned in the inflator in a preferably axially braced manner.

Especially good positional fixing as well as sealing is resulting from the fact that the bent portion is adjacent to a corner portion of the inflator formed by a circumferential wall and a bottom. The filter can be positioned laterally but also axially and biased, where appropriate, via the corner portion.

The filter is laterally spaced apart especially from discharge orifices provided in an external housing of the inflator so that a chamber can be formed ahead of the discharge orifices which permits a flow through the entire filter portion and not only through the portions of the filter positioned directly ahead of the discharge orifices.

For obtaining the axial stability and for improving the sealing effect at the edge of the filter, for instance at an axial end, preferably at the end opposed to the bent end, the filter can be tapered. Such tapering can be obtained by plastic deformation of the filter or by introducing less material in this portion. In particular, however, the tapered end should be relatively resilient so that it can optimally adapt to the adjacent wall during mounting in the inflator.

The filter is adjacent at its axial ends, especially at the end faces, to the inflator parts. The radially innermost contact point of the bent end should preferably be located at the associated inflator part radially further outwardly than the radially outermost contact point of the opposed axial end at the associated inflator part. This means that in axial direction when axially bracing the filter the contact faces are laterally offset so that a slight bending is possible. In this way, too, the axial elasticity is to be improved.

The filter preferably consists of a wire mesh having wires of substantially equal cross-section. According to another preferred embodiment, the filter can also be made of wires having different thicknesses. Usually the filters are knitted wires.

When the filter has a tapered axial end, said tapered portion can be formed especially simply by integrating a larger length of thin wires related to the volume than in the neighboring portion so that said tapered portion also becomes softer.

The invention further relates to an inflator, especially according to the type described before and/or hereinafter which excels by a rapid ignition of its pyrotechnic material. This is obtained with an inflator having at least one igniter, especially in the form of a pre-fabricated component (squib as it is called). Pyrotechnic material disposed in a combustion chamber is ignited directly or indirectly via at least one overflow orifice by activating the igniter.

The gas and the hot particles flowing either directly from the igniter or from the igniter and a booster charge into the combustion chamber ignite the pyrotechnic material there.

In accordance with the invention, it is provided that after activating the igniter for igniting the pyrotechnic material such overflow orifice is movable or is moved relative to the former. The igniting gas, as it is called, and the hot particles consequently do not flow at a fixed position of the so-called propellant into the same but brush different portions of the propellant during the igniting operation so that the igniting area is increased on the whole. This improves the igniting rate and thus ensures a more rapid increase in pressure.

The relative movement between the overflow orifice and the pyrotechnic material, the so-called propellant, can be caused by relative movements of the propellant or else, preferably, by a movable wall. The movable wall includes the overflow orifice or orifices and moves, so-to-speak, along the propellant and is movable relative to the latter.

In accordance with an embodiment, an intermediate chamber is provided between the igniter and the combustion chamber. This intermediate chamber can receive, for instance, a booster charge or else can be filled with ignitable gas. Said intermediate chamber is separated from the combustion chamber by a cap. The cap is provided with the overflow orifice(s) and is arranged in the inflator such that it is movable by activating the igniter or that it is moved after activating the igniter.

A further peculiarity of the inflator according to the invention, which can be employed in combination just as the other peculiarities solely or together with one or more other ideas especially according to the type described before and/or hereinafter, ensures easy or simplified manufacture of the inflator. The latter includes at least one igniter, especially in the form of a pre-fabricated component and an intermediate chamber (especially receiving a booster charge). Said intermediate chamber is preferably arranged, as already explained, between the igniter and the combustion chamber. This means that the intermediate chamber is adjacent to the igniter and the ignition gas of the igniter flows into the intermediate chamber. The intermediate chamber itself is confined by a cap pushed onto a base with its igniter-side open end. In the case of previous caps, they are frequently pressed and beaded in a bore of a very massive part or are welded to a base, which requires more complicated manufacture, as a matter of course, than pushing onto a base provided anyway.

The cap can be pressed with or onto the base and/or can be disposed at the base such that it is movable or is moved when activating the igniter. The moving force required to move the cap can be applied by the igniting gas when activating the igniter or else by the igniting gas of the igniter and the additional gas generated in the intermediate chamber.

In the non-activated state of the inflator, the cap preferably should be adjacent at the end face to a resilient component, especially to a resilient packing. Resilient packings at the edge of or in the propellant bed are preferred to pretension the bed of pyrotechnic material (chaotic bed). In this context, the resilient packing has a double function, as it serves as volumetric balancing member and, simultaneously, as a stop and more exactly speaking as a movable stop for the cap. In order to obtain an improved compactness, the packing may have a recess into which portions of the cap project. During its movement the cap can compress the resilient component so that only in this way the movement path is made possible.

The resilient component can also additionally be in the form of a filter, especially made of knitted mesh.

It is also taken into consideration that the resilient component is preferably adjacent to the inside of a front wall of the inflator.

The base is formed, for instance, by injection-molding around the igniter and is preferably provided to fix the igniter at the inflator.

In accordance with an embodiment, the cap forms a partition between the intermediate chamber and a combustion chamber which is preferably filled with pyrotechnic material. The cap can be the only partition between said chambers.

The cap has at least one, preferably plural lateral overflow orifice(s) uniformly spaced at the circumference.

Inflators are activated by transmitting an electric pulse through contact pins accessible from the outside of the inflator to an igniter disposed inside the external housing of the inflator.

The fast and tight, especially moisture-tight, connection must be ensured over the entire service life of the inflator.

In another aspect of the invention the inflator, especially according to the type described before and/or hereinafter, includes an external housing, preferably having a central axis, and an igniter embedded in a base, the external housing or a part connected to the external housing including a recess into which the base extends. The wall forming the recess has portions bent radially inwardly and has an outwardly extending bulge distant from the port of the recess. In this way a type of undercut is formed in which the material of the base extends radially further outwardly than the wall of the external housing or, in the case of a non-integral design, the part connected to the external housing in the port area. Thus the base and the igniter are additionally secured.

The bulge can be annularly circumferential, preferably relative to the central axis. It is also possible, however, to provide individual bulges only at individual positions along the circumference of the recess.

The wall forming the recess preferably has, adjacent to the bulge, the same wall thickness as in the bulged portion, i.e. the wall is bent as a whole and the contour at the inside follows the one at the outside.

Viewed in an axial section, the recess may be S-shaped, wherein the mouth portion of the wall forming the recess extends outwardly. Preferably no sharp edges or transitions are provided but a uniform rounding of the inner wall of the recess. In this way, the plastic material forming the base can easily fill the bulges during injection-molding.

The invention moreover provides an inflator, especially according to the type described before and/or hereinafter, comprising an external housing, preferably having a central axis, and a pre-fabricated igniter embedded in a base, the external housing or a part connected to the external housing having a recess into which the base extends, and a wall forming the recess having a bottom portion including an orifice through which the base extends, wherein the bottom portion has at least one projection and/or one indentation on its opposed outsides in the area in which the base is adjacent to the same. This design ensures, apart from a fast connection, also an improved tightness against possible moisture paths from outside.

For example, the edge of the orifice may have a convex projection at an outside. In this context, "outside" means the side facing the outside of the inflator.

The projection can be formed by a circumferential bead, for instance. It is possible that at this position the wall thickness of the bottom portion is increased.

The bottom portion is formed, e.g., by a part or portion of a closing member which, in turn, is part of the external housing of the inflator. But for this purpose also a separate part of the inflator can be provided.

The bottom portion preferably has an especially annularly circumferential indentation at the outside opposed to the projection in the area of the projection. This indentation is directed into the interior of the inflator, for instance.

Both the projection and the optional indentation are advantageously surrounded by or filled with the plastic material of the base.

This is of particular advantage when the base is formed by injection-molding around at least portions of the wall forming the recess, because in this way a tight connection is provided.

In another aspect of the invention, an inflator according to the invention, especially according to the type described before and/or hereinafter, comprises an external housing having at its outer circumference a flange, the flange being non-symmetrical or having a shape deviating from the symmetry in order to ensure an unambiguous mounting position at least in twisting direction when the inflator is fastened.

The non-symmetry can be advantageously obtained by the fact that at least one notch is provided in the flange as a mounting positioning means. As a matter of course, also other mounting positioning means permitting a so-called indexing can be provided.

In a possible configuration plural, especially three, notches are provided which are arranged at different angular distances along the circumference of the flange. In this way the mounting position of the inflator is clearly defined by simple means.

As an alternative or in addition, a positioning orifice, especially an oblong hole, can be provided in the flange as mounting positioning means.

The invention also relates to a module including an inflator mentioned above and/or hereinafter. The module has a holding member at which preferably a counter-piece engaging in the mounting positioning means of the flange is provided.

The counter-piece can at least include a projection formed at the holding member, for instance.

It is possible that the holding member has at least one fastening bolt, the latter being adjacent to the outer circumference of the flange. Preferably the fastening bolt is not adjacent to the flange in the area of the mounting positioning means but is distant hereof.

The module can be especially an airbag module but can also be a different assembly including an inflator, for instance a tensioning drive.

If the module is an airbag module in which an airbag having an inlet orifice is provided, the edge of the inlet orifice is advantageously clamped between the flange and the holding member.

The invention further relates to an inflator, especially according to the type described before and/or hereinafter, comprising a combustion chamber filled at least partly with pyrotechnic material which is confined by combustion chamber walls, wherein all combustion chamber walls consist of the same material, especially of the same steel.

A combustion chamber wall must have a particular inherent stability so that it is not completely destroyed after activating the inflator during ignition of the pyrotechnic material. The pyrotechnic material is directly adjacent to said stable combustion chamber walls and thus contacts the combustion chamber walls in some cases for many years without any chemical variations being intended to occur. The invention provides that all combustion chamber walls consist of the same metal, especially steel. So far the combustion chamber walls have been manufactured of different materials mainly by virtue of their different loads. The invention simplifies the concept of an inflator, for the so-called propellant compatibility with adjacent components is ensured, if actually all combustion chamber walls consist of the same material. Thus only a material pairing of pyrotechnic material with combustion chamber material has to be tested. It is especially preferred that also possible walls delimiting the combustion chamber against the igniter and/or against the intermediate chamber are formed of the same material, especially of steel, and especially of the same steel.

The combustion chamber walls are especially plural interconnected parts, these parts especially being load-bearing components. Load-bearing components are those components which are still retained after combustion of the pyrotechnic material.

In this context and also in connection with other peculiarities of the invention mentioned before and hereinafter, it is emphasized that the inflator according to the invention especially is an inflator having an annular chamber in the form of a combustion chamber. Such inflators are also referred to as toroidal inflators.

It is another characteristic of the inflator according to the invention that its axial height is less than its diameter. Inflators of this type are integrated in particular in steering wheel airbag modules.

Another aspect of the invention provides that an inflator according to the invention, especially according to the type described before and/or hereinafter, includes an external housing and a combustion chamber arranged inside the external housing which contains pyrotechnic gas-generating material, wherein the wall thickness of the component parts, especially of the metallic component parts, of the external housing is 2 mm or less. This saves weight.

The external housing can consist of a diffuser and a closing member, the diffuser and the closing member preferably being cup-shaped. The diffuser and the closing member can be fitted into each other, wherein an upwardly bent edge of the closing member is located inside the especially pot-shaped diffuser and is adjacent to the inner wall of the diffuser.

The closing member and the diffuser can be fastened to each other by one single connection defining the strength, i.e. no tension rod or the like is provided. The connection is in particular a circumferential weld between the diffuser and the closing member. The weld can be formed, e.g., by laser welding. In other words, the wall thickness of the external housing thus is in total 2.0 mm or less, wherein an overlapping area of the parts forming the external housing (especially in the area of the joining weld) is left out of consideration.

Preferably the wall thickness of the diffuser amounts to a maximum of 2.0 mm, 1.9 mm, 1.8 mm, 1.7 mm, 1.6 mm, 1.5 mm, 1.4 mm, 1.3 mm, 1.2 mm, 1.1 mm or 1.0 mm. Further preferably the wall thickness of the closing member amounts to a maximum of 3.0 mm, 2.9 mm, 2.8 mm, 2.7 mm, 2.6 mm, 2.5 mm, 2.4 mm, 2.3 mm, 2.2 mm, 2.1 mm, 2.0 mm, 1.9 mm, 1.8 mm, 1.7 mm, 1.6 mm, 1.5 mm, 1.4 mm, 1.3 mm, 1.2 mm, 1.1 mm or 1.0 mm. In this way the inflator can be designed more easily and the total energy range of the vehicle can be optimized.

It is preferred that upon activation the inflator develops a maximum combustion chamber pressure of 360 bar, 340 bar, 320 bar, 300 bar, 290 bar, 280 bar, 270 bar, 260 bar or 250 bar which the walls have to withstand. In this way, the entire configuration of the inflator and of the module can be optimized and the manufacture can be made more inexpensive.

The combustion chamber preferably has a substantially toroidal shape, wherein especially in the center of the toroid the igniter is arranged and a booster charge is possibly arranged in an intermediate chamber.

Preferably the ratio of the maximum combustion chamber pressure formed upon activation of the inflator to the wall thickness of the external housing is more than 120 bar/mm, especially more than 130 bar/mm, 140 bar/mm, 150 bar/mm, 160 bar/mm, and/or 170 bar/mm. Further preferably the ratio of the maximum combustion chamber pressure formed upon activation of the inflator to the wall thickness of the external housing is less than 250 bar/mm, especially less than 240 bar/mm, 230 bar/mm, 220 bar/mm, 210 bar/mm, 200 bar/mm, 190 bar/mm and/or 180 bar/mm.

The ratio of the entire discharge area of the inflator, viz. of the entire area of all discharge orifices of the inflator, to the wall thickness of the external housing preferably is more than 27, 28, 29, 30, 31, 32 or 33 mm. The ratio of the entire discharge area of the inflator, viz. of the entire area of all discharge orifices of the inflator, to the wall thickness of the external housing preferably is more than 32, 33, 34, 35, 36 or 37 mm.

The ratio of the diameter of the diffuser to the smallest wall thickness of the external housing preferably is smaller than 50 and/or larger than 30, preferably between 31 and 49, especially between 32 and 48, especially between 33 and 47, especially between 34 and 46, preferably between 35 and 45. The projecting fastening flange is not added when measuring, but only the inflator part defining the hollow which is formed by the external housing has to be measured. The diffuser advantageously has a substantially cylindrical circumferential wall.

The ratio of the diameter of the diffuser to the maximum axial height of the inflator preferably is about 1.8±0.7, especially 1.8±0.5, especially 1.8±0.4, further preferably 1.8±0.3, especially 1.8±0.2, preferably 1.8±0.1.

It is not necessary to use a tension rod, i.e. an additional connection between the upper and the lower area of the external housing, but it is possible as an option.

The inflator preferably has a flat cylindrical shape and thus its width is larger than its height.

The present invention provides further peculiarities which may be provided in addition to or separately from the characteristics and features mentioned before and hereinafter.

In addition, the constructed space of an inflator is to be reduced. In this respect, the invention provides various options which can be employed individually or in combination.

The external housing of the inflator, especially according to the type described before and/or hereinafter, includes a flange provided at its outer circumference which is circumferentially closed. Said flange is preferably planar and is transformed in a transition area, which hereinafter shall not be added to the flange, with a radius into the actual external housing. That is to say, the flange is transformed into the external housing. Concerning the flange width the radius is not added in the following.

According to an idea, the flange is formed without through-holes. Through-holes reduce the clamping area between the flange and an adjacent component, especially an airbag clamped to the flange, so that more support area and thus clamping area is provided without the through-holes. Since the airbag includes an inlet orifice with an orifice edge which is especially coated, for instance with silicone, the flange can establish sort of an adhesive or glued connection with the orifice edge. The missing through-holes increase the displacing force required to displace the airbag.

It is another or an additional possibility that the airbag and the flange have a joint annular clamping area that features a width between 5 and 12%, preferably between 6 and 11%, further preferably 8 to 10% of the maximum diameter of the external housing of the inflator. The diameter of an inflator reveals a lot about the generated gas volume, which in turn allows concluding therefrom the pressure exerted on the airbag and the displacing force of the airbag. A minimized flange diameter is obtained by reducing the flange width to the predetermined values.

Another or an additional option provides that the annular clamping area for the airbag has a width at the flange which ranges from 6 to 9.5 mm, preferably from 5 to 8.5 mm, further preferably from 5.5 to 7.5 mm. This small width is clearly different from previous flange widths.

For minimizing the flange an airbag module according to the invention may be provided which includes an inflator, especially an afore-mentioned inflator, which at its external housing and the outer circumference thereof has a flange, an airbag with an injection orifice defined by an orifice edge and a clamping member opposed to the flange. Said clamping member can be a separate ring or a separate component, for instance a diffuser cage or the like or an inflator carrier in order to clamp the orifice edge between the same and the flange. The clamping force is adapted in the area of the orifice edge and the clamping area such that the lateral displacing force occurring by the maximum pressure in the airbag at the orifice edge is between 10 and 80%, preferably between 20 and 50% less than the friction force generated by the clamping force between the orifice edge, the flange and the clamping member. This relatively simple design is sufficient, as it has turned out, to minimize the clamping flange.

The afore-mentioned airbag module or an airbag module according to the invention deviating herefrom provides that in the clamped portion of the orifice edge the airbag has only an opening serving for circumferential positioning, if at all. Consequently, no clamping orifice is provided through which a respective screw extends. Holes in the area of the circumferential edge of the airbag weaken the airbag fabric and reduce the support surface. An aspect of the invention provides that such weakening is avoided and instead the larger surface of the orifice edge is provided for clamping.

It has to be emphasized that the individual features mentioned before and in the following description can be combined in any way. The invention is not restricted to be realized in individual features or in groups of features only.

In accordance with a further aspect of the invention, the inflator, especially according to the type described before and/or hereinafter, has an external housing including a diffuser with a substantially cylindrical circumferential wall having plural discharge orifices and a closing member welded with the diffuser, wherein the diffuser and the closing member are preferably cup-shaped and wherein the discharge orifices are covered at the inside of the diffuser by a tamping, preferably in the form of a tamping film, and the tamping is spaced apart from the inner edge of the closing member, especially a weld, preferably a laser weld, between the diffuser and the closing member. This design has the advantage that the tamping is protected in later assembly steps and therefore is not thermally affected especially in welding processes during which heat is developed.

Preferably the distance is more than 2 mm, especially preferred it is more than 2.5 mm, especially more than 3 mm. The distance preferably amounts to less than 7 mm, especially preferably it is less than 6 mm, in particular less than 5.5 mm. Thus the distance preferably ranges from 3 to 7 mm and further preferably from 3 to 5.5 mm.

The closing member may have a circumferential upright edge to which it is welded with the diffuser, and the smallest distance of the weld from the tamping amounts to at least the afore-mentioned distance values. In this way a robust and good tamping of the discharge orifices of the inflator can be achieved.

As mentioned already it is important that the igniter is arranged fixedly and tightly in the inflator and remains so during the entire service life of the inflator.

According to the invention, this object is achieved by the fact that the inflator, especially in accordance with the above and/or below described type, includes an igniter having an igniter cap which is at least partly surrounded by plastic injection-molding, the material of the igniter cap and the material of the plastic molding being selected such that during injection molding the igniter cap at least partly melts into the plastic injection molding, i.e. partial melting of the cap is also included.

In this way, an especially tight and fast connection is obtained between the plastic injection molding and the igniter.

The igniter cap can be part of the igniter itself which is preferably supplied as a pre-fabricated part or it can be a separate component which is attached onto the igniter before the latter is surrounded by injection molding.

Preferably, the igniter cap and the plastic injection molding consist of the same material. This material may contain glass fibers, the glass fiber share preferably being approx. 20-40% by weight and especially preferred being approx. 30%.

The plastic injection molding of the igniter advantageously forms the basis by which the igniter is connected to the external housing. This could also be a different component, however, which is finally in turn connected to the external housing in order to tightly connect the igniter to the external housing.

The external housing preferably includes an orifice and the plastic material is injection-molded around the edge of the orifice, in particular to seal the external housing to the outside.

Furthermore, the invention relates especially to an inflator, preferably for a vehicle occupant restraint system and preferably according to the above and/or below described type, comprising a first component and a second component which is connected to the first component through an injected plastic base in that both components are at least partly surrounded by injection molding. The invention further relates to a method of manufacturing an inflator.

In a conventional inflator the first component, for instance, is a cover of a generator housing which is connected to the second component, viz. an igniter, in that the igniter is arranged in an orifice disposed in the cover and both parts are jointly surrounded by injection molding. In this way, a simple connection is provided between the igniter and the generator housing which excels by low weight and low manufacturing costs.

It is intended according to the invention to provide an inflator or a method for manufacturing an inflator in which the junction of the components has improved tightness.

In accordance with an aspect of the invention, in an inflator of said type it is provided that the first component has an adhesive film applied before injection molding in a contact area with the plastic base. A particularly tight connection between the plastic base and the first component is achieved by the adhesive film. In contrast to a sealing formed by shrinking a plastic material, in the inflator according to the invention the first component may have almost any geometry, wherein additional geometrical elements for increasing the tightness, such as undercuts or injection moldings around parts, can be dispensed with. Also additional components such as a metallic film serving as bar to moisture or an annular packing are not required. Therefore, the inflator according to the invention can be manufactured in an especially simple and inexpensive manner.

The first component preferably consists of metal, ceramic and/or plastic material.

As mentioned already in the beginning, the first component preferably is an inflator housing or forms a partial element of an inflator housing.

The second component especially is a pre-fabricated igniter closed to the outside. This igniter in general has a metallic outer shell so that it may be advantageous when also the igniter (or only the igniter which then has to be regarded as first component) is provided prior to injection molding with an adhesive film forming a bonding bridge.

A particularly simple joining of the components results from the fact that the first component has an opening for receiving and mounting the second component whose edge is embedded in the plastic base during injection molding. In the case of an igniter as second component, the electric connections thereof can project from the first component, especially the inflator housing, through the opening.

In accordance with a preferred embodiment of the invention, the surface of the adhesive film exactly corresponds to the contacting surface between the plastic base and the first component, whereby an improved adhesion of the plastic base to the first component is ensured all over the surface.

Depending on the shape of the first component, it may be sufficient, however, when the surface of the adhesive film is smaller than the contacting surface between the plastic base and the first component. In this way, too, a reliable sealing can be achieved already in many cases.

Another variant of the invention provides to design the surface of the adhesive film to be larger than the contacting surface between the plastic base and the first component. Then the adhesive film in addition serves as an anti-corrosive layer.

Advantageously the adhesive film is a pre-fabricated part. It can be applied like a known tamping film.

Preferably the adhesive film includes a plastic film and an adhesive layer. The adhesive layer is advantageously applied directly to the plastic film. The adhesive film can be glued with its adhesive side onto the first component so that the adhesive layer keeps the adhesive film fixed to the metallic first component during injection molding. The plastic material introduced during injection molding gets into contact with the plastic film which protects the adhesive film disposed there below against the high temperatures.

Advantageously the plastic film consists of the same material as the plastic base or of a material which is suited to establish a connection with the material of the plastic base.

Preferably the plastic film melts into the plastic base when the plastic base is injection-molded. Along a joining zone a fixed connection is formed between the adhesive film and the plastic base. As an alternative, the fixed connection can also be brought about by a chemical reaction of the material of the plastic base with the material of the plastic film.

The adhesive film, especially the adhesive layer, preferably forms a bonding bridge between the first component and the plastic base which of advantage is plastically and/or elastically deformable. In this way, tensions and shearing forces occurring upon a change of temperature due to different expansion forces of the materials can be compensated.

The adhesive can be applied to the plastic film in an exactly defined, for instance constant layer thickness.

The adhesive of the adhesive layer can be activated or hardened e.g. by a predetermined contact pressure or a thermal influence. For this purpose, for instance the contact pressure during gluing or the thermal influence by the liquid plastic material used during injection molding can be exploited.

As material for the plastic film e.g. a thermoplastic elastomer (TPE) is taken into consideration.

In accordance with a second aspect of the invention, a method of manufacturing an inflator, especially for a vehicle occupant restraint system, is provided, the method comprising the following steps. First of all, a first component containing metal and/or ceramic and/or plastic material and a second component to be connected to the first component are provided. Subsequently, an adhesive film is applied to the first component in a joining area, and the second component is positioned relative to the first component. The first and second components are jointly surrounded at least partly by injection molding, thereby a plastic base connecting the components being formed. As already described with respect to the inflator according to the invention, the first component preferably is an inflator housing or part thereof and the second component is a pre-fabricated igniter.

Preferably the plastic film of the adhesive film melts into the plastic base when the two components are surrounded by injection molding.

Moreover, also all advantageous further developments mentioned with respect to the inflator apply to the method according to the invention.

Furthermore, the object underlying the invention is to improve a module comprising an inflator, an airbag inflatable by the inflator and a mounting means for mounting the module, especially in the interior of a vehicle, in such way that the manufacturing costs thereof can be reduced.

This object is achieved for such module according to the invention by the fact that the inflator is formed in accordance with at least any one of the claims to 1 to 103.

Further features and advantages of the invention result from the following description of plural preferred embodiments in connection with the enclosed drawings in which:

BRIEF DESCRIPTION OF THE DRAWINGS

FIG. 4b illustrates a variant of the flange shown in FIG. 4a;

FIG. 1 shows an inflator 10 comprising an external housing 12 being composed of a cup-shaped diffuser 14 having a substantially cylindrical circumferential wall 16 and a closing member 18 which also forms the bottom of the inflator 10.

Figure 1:
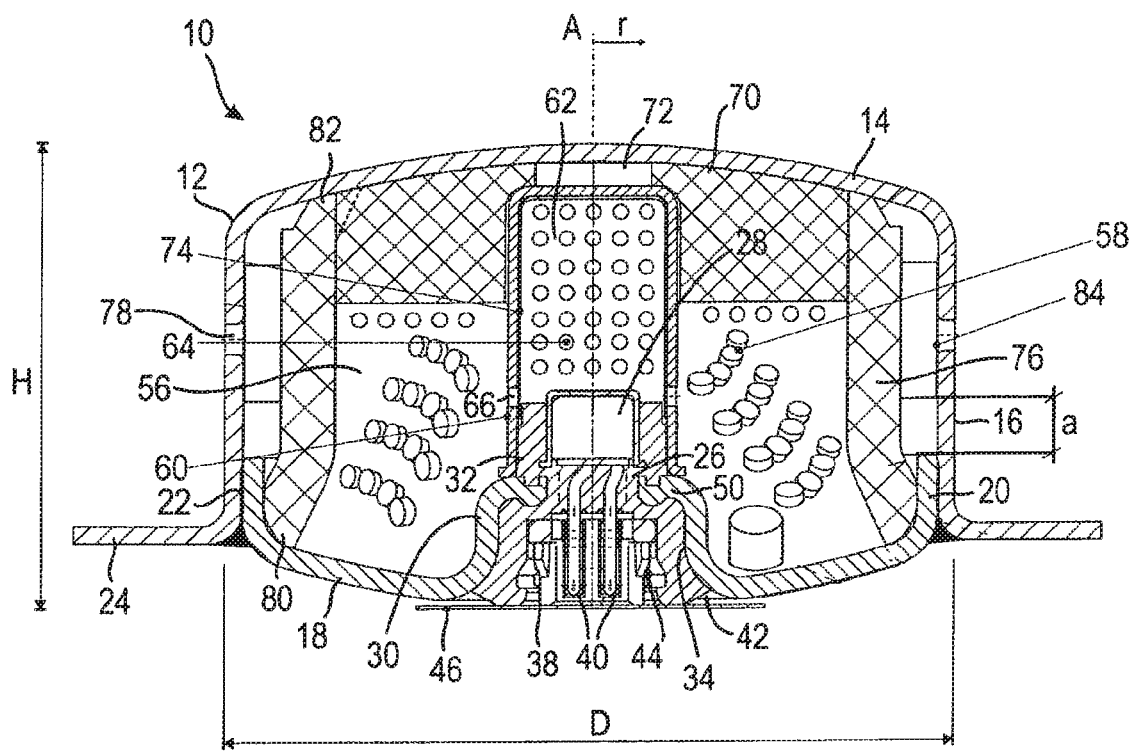
FIG. 1 shows a sectional view of an inflator according to the invention.

The closing member 18 includes a circumferential upright edge 20 which is adjacent to the inside of the circumferential wall 16 of the diffuser 14 and is fixedly connected to the same by way of a weld 22. The weld 22 preferably extends along the entire contact surface between the closing shell 18 and the diffuser 14 and to the outside of the inflator 10, where it fills a groove existing between the closing member 18 and the diffuser 14. For connecting the diffuser 14 and the closing member 18 a laser welding method can be used, for instance.

At the closing member side end, the circumferential wall 16 of the diffuser 14 is bent outwardly so that a planar flange 24 being horizontally circumferential along the inflator 10 is formed.

Figure 2:
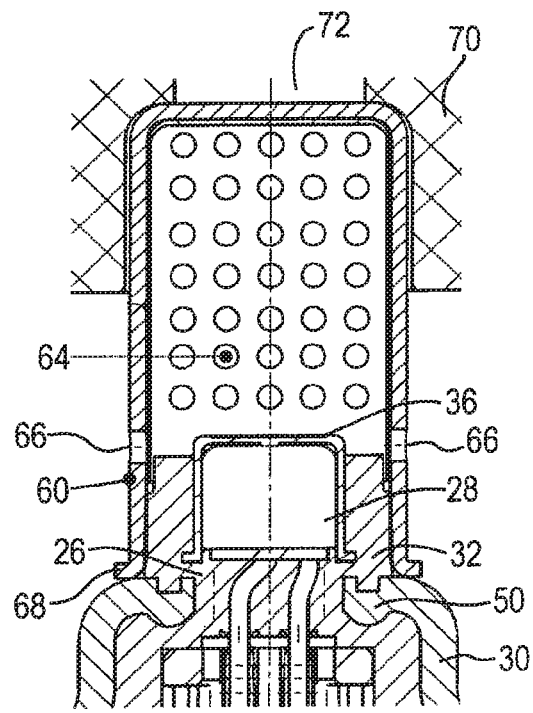
FIG. 2 is a detailed view of FIG. 1.

The closing member 18 has a central orifice 26 which serves for receiving a pre-fabricated igniter 28. The closing member 18 has a recess 34 including an annular portion 30 toward the central orifice 26. The recess 34 is sort of an inversion of the external housing. This area of the inflator 10 is illustrated in detail in FIGS. 2 and 3.

The igniter 28 is enclosed by a base 32 connecting the igniter 28 also to the closing member 18 and especially to the edge of the orifice 26 and the annular portion 30.

The base 32 consists of plastic material and is injection-molded after introducing the igniter 28 into the orifice 26. During injection-molding the plastic material encloses both the major part of the igniter 28 and the edge of the orifice 26 and also completely fills the recess 34 formed by the annular portion 30 at the outside of the inflator 10 with the exception of an outwardly directed igniter plug receipt 38 into which the contact pins for an electric contacting of the igniter 28 protrude. The igniter 38 is simultaneously embedded in the base 32 during injection molding. The orifice 26 is completely closed by the base 32 and the igniter 28 and the recess 34 is so-to-speak lined by the base.

In this case the igniter 28 is enclosed by the base 32 so far that merely its upper side as well as a short upper portion of an igniter cap 36 are left open.

The igniter 28 preferably is a separate pre-fabricated component. The igniter cap 36 is either part of the pre-fabricated igniter 28 or a separate component placed onto the igniter 28.

The igniter cap 36 in this example consists of plastic material, namely of a plastic material similar to that of the base 32, preferably of an identical plastic material. A standard material having a share of glass fiber is preferably used, wherein the glass fiber share may be, for instance, 30% by weight. The use of a similar or identical plastic material entails the fact that during injection-molding the igniter cap 36 melts completely or partly with the base 32 and in this way a tight and non-detachable connection is formed.

The recess 34 can also be formed at a separate part of the inflator 10 which is connected to the external housing 12, especially to the closing member 18.

At the outside of the recess 34 a circumferential indentation is formed between the closing member 18 and the base 32, which indentation is filled with a sealant 42, in this case in the form of an acrylate adhesive.

The sealant 42 is selected such that it adheres both to the metal of the closing shell 18 and to the plastic material of the base 32. The sealant 42 is applied from outside after injection molding of the base 32 and is located completely outside the external housing 12 of the inflator 10 and completely in the circumferential indentation.

The sealant 42 is applied in liquid or pasty form and is hardened by UV light. It has high flexibility also at low temperatures of up to −40° C. It features low viscosity so that it is easy to process, has good wetting properties both for metallic and for plastic surfaces and adheres both to metal and to plastic material.

The sealant has at least one of the following properties:

Breaking strength according to ISO 527 [MPa] 2-4, esp. 3;

Elongation at break according to ISO 527 [%] 200-400, esp. 300±40;

Viscosity at 23° C. according to Brookfield Sp/U and 3/100 [mPas] 400-800, esp. 600±80;

Glass transition temperature (rheometer) [° C.] 10-30, esp. 20±4;

Thermal expansion coefficient at 30-140° C. [ppm/K] 150-350, esp. 260±30;

Density at 23° C. [g/cm3] 0.6-1.5, esp. 1.0±0.1;

Water absorption according to ISO 62, 24 h at 23° C. [%] 0.9-1.7, esp. 1.3±0.2.

A dye, preferably a fluorescent dye, is added to the sealant 42. This permits simple control whether the sealing bead has been completely applied and the recess is completely filled with the sealant 42. When irradiated with UV light, it can be easily recognized due to the fluorescent dye at which position the sealant 42 is provided. If a non-fluorescent dye is used, for the same a color other than for the base 32 and the closing member 18 is chosen so that it can be recognized by way of the color whether the sealing bead is complete and circumferential.

This can be checked using a camera.

Prior to mounting into an airbag module, the contact pins 40 of the inflator 10 are connected via a short-circuit bridge 44. The igniter plug receipt 38, the base 32 and the sealant 42 are covered in this state by a laminate film 46 and are protected against environmental influences in this way.

The wall forming the recess 34 is arc-shaped in portions in the radial direction r (cf. FIG. 3) in such a manner that one or more bulges 48 extending in radial direction away from the recess 34 are formed. The inflator 10 has a central axis A (cf. FIG. 1). Relative to this central axis A the arc forming the bulge 48 in this example extends in ring shape around the recess 34.

It is also possible to form the bulge 48 in circumferential direction intermittently and to provide only one or more separate bulges 48 along the circumference of the recess 34. The extension of the wall is shown in broken lines in FIG. 3. The wall thickness of the wall of the recess 34 is unchanged in this case vis-à-vis the wall thickness outside the bulge 48.

Figure 3:
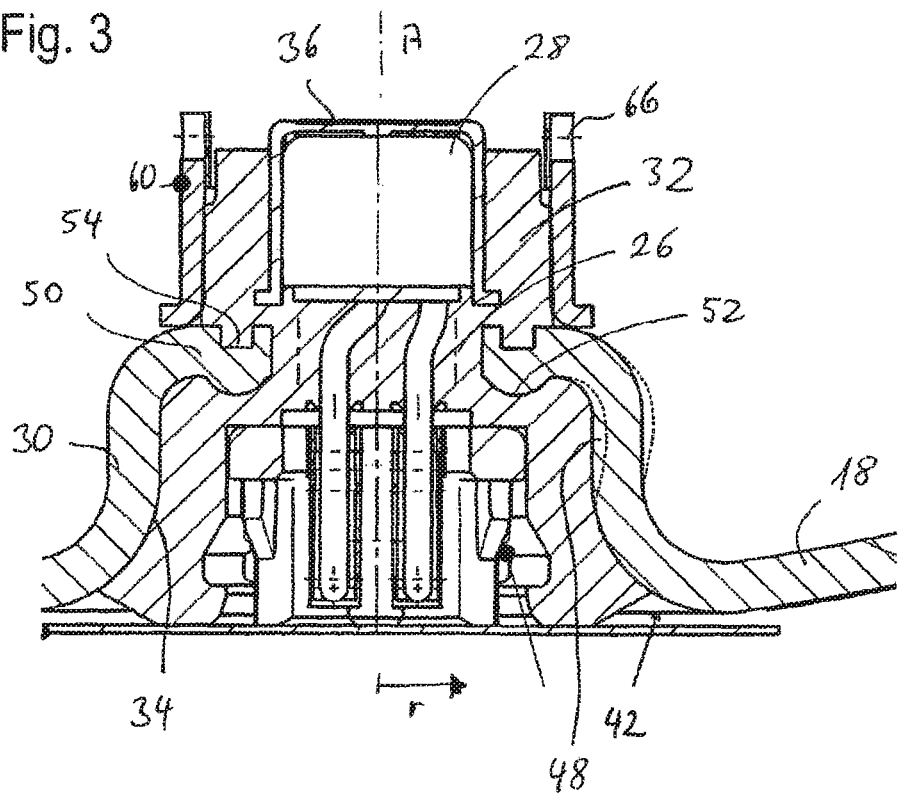
FIG. 3 is another detailed view of FIG. 1.

In the section shown in FIG. 3 the wall of the recess 34 forms an S-shaped curve in the area of a bulge 48, the opening portion (lower axial end) of the wall forming the recess 34 extending outwardly.

Apart from the annular portion 30, the recess 34 includes a bottom portion 50 which is connected to the annular portion 30 toward the interior of the inflator 10. The bottom portion 50 also forms the edge of the orifice 26. At the bottom portion 50 an annularly circumferential projection 52 is formed at the edge of the orifice 26 toward the outside of the inflator (provided with reference numerals only in FIG. 3). The projection 52 forms a convex shape and is shaped without any sharp edges. On the opposed side (inner side) the bottom portion has an indentation preferably rectangular in profile which extends equally circumferentially along the edge of the orifice 26 and whose orifice is directed toward the interior of the inflator 10.

Both the groove 54 and the projection 52 are enclosed by liquid plastic material when the base 32 is injection-molded so that a fast and tight connection to the base 32 is formed which also withstands temperature variations and constitutes an additional support during and after solidification of the plastic material. Also the groove 54 is shown with reference numeral in FIG. 3 only.

Inside the external housing 12 an annular, thus substantially toroidal combustion chamber 56 is formed (cf. FIG. 1) which is filled with a known pyrotechnic gas-generating agent 58, indicated by some tablets in this case.

Toward the central axis A of the inflator 10, the combustion chamber 56 is confined by a cap 60 enclosing the igniter 28 and the portion of the base 32 located inside the inflator 10 as well as in addition a free space in the form of an intermediate chamber 62. The intermediate chamber 62 is filled with a boosting charge of known pyrotechnic gas-generating material 64.

The cap 60 (cf. FIG. 2) has plural overflow orifices 66 providing a communication between the intermediate chamber 62 and the combustion chamber 56. In this example, the cap 60 is made of steel. It is closed at the upper end and open at the lower end and has a substantially cylindrical wall in which the overflow orifices 66 are disposed. The cap 60 is outwardly bent at the open end so that a short flange 68 is formed (cf. FIG. 2). After introducing the boosting charge 64, the cap 60 is merely pushed onto the base 32 and is possibly pressed with the same or pushed onto the same forming a press-fit. Fastening by welding is not provided. This leads to the fact that, when activating the inflator 10 and igniting the igniter 28, the cap 60 can move in the upward direction, i.e. away from the igniter 28. In this way, in the course of the burning operation also the overflow orifices 66 move upwards, i.e. relative to the propellant. Thus further portions of the propellant bed in the combustion chamber 56 contact the hot gases flowing out of the intermediate chamber 62 and are ignited.

The upper portion of the combustion chamber 56 in FIG. 1, viz. at the side of the external housing 12 opposed to the igniter 28, is provided with an elastic component 70, in this case a filler or volume compensating element which contacts the upper side of the diffuser 14. The elastic component 70 is formed of a wire mesh here and can be compressed when the cap 60 moves. Further moving space for the cap 60 is gained from the bulge of the inflator 10 during gas formation during which the upper side of the diffuser 14 is slightly raised.

The elastic component 70 has a central recess 72 into which the cap protrudes up to a step and whose upper end portion is somewhat smaller than the diameter of the cap 60 in order to counter the movement of the cap 60 by a defined moving resistance.

In this case the cap 60 constitutes the only partition wall between the intermediate chamber 62 and the combustion chamber 56. It is possible that the inside of the cap 60 is lined with a protective film 74 closing the overflow orifices 66 prior to activation of the inflator 10, wherein the protective film 74 is destroyed upon ignition of the igniter 28.

In the state before activation shown in FIG. 1, the overflow orifices 66 are located directly at the upper edge of the base 32 so that they have an as large moving distance as possible in the direction of the central axis A.

A filter 76 is arranged in the combustion chamber 56 which in this case is ring-shaped, substantially cylindrical and extends in parallel to the circumferential wall 16 of the diffuser 14 at a small radial distance from the same.

The filter 76 extends over the entire height of the inflator 10 and extends from the closing member 18 to the end face of the diffuser 14. The filter 76 is formed of a wire mesh including wires of different thickness.

In the circumferential wall 16 of the diffuser 14 plural, in this example twelve, discharge orifices 78 are formed which are uniformly spaced along the circumference of the diffuser 14 and are arranged at an axial height. The filter 76 separates the discharge orifices 78 from the combustion chamber 56 so that the filter 76 is located upstream of the discharge orifices 78.

The filter 76 is pressed into the external housing 12 with axial pretension.

The filter 76 includes two axial ends 80, 82 at least one end of which is bent outwardly. In this case the bent portion forms the lower axial end 80 and the bending extends straight. In the bent portion the filter 76 has the same thickness as it has also in a central portion which is adjacent to the bent portion.

In the shown example the filter 76 extends in S-shape viewed in an axial section. At the upper axial end 82, too, a slight bending is provided which extends toward the center of the inflator 10, however (indicated on the left half in FIG. 1 by broken lines).

At the filter 76 the radially innermost contacting position of the outwardly bent lower axial end 80 is located radially further outward than the radially outermost contacting position of the inwardly bent axial end 82 so that the end-face contact surfaces are laterally completely offset.

The bent portion at the lower axial end 80 is adjacent to a corner formed by the housing of the inflator 10. In this case the housing part is formed by the closing member 18 and the lower axial end 80 of the filter 76 is adjacent to the transition from a bottom plate of the closing member 18 to the upwardly bent edge 20 of the same.

At the upper axial end 82 the filter 76 is tapered, as is visible especially on the right side of FIG. 1. At this end, the filter 76 has a larger length of thin wires, relative to the volume, than in the adjacent area and preferably than in the residual filter, which renders the tapered area very flexible.

This shaping permits to deform the material during axial pressing into the inflator such that no bypass is formed for particles possibly occurring during combustion of the pyrotechnic material 58.

The pyrotechnic material 58 in the combustion chamber 56 is surrounded with metal on all sides, i.e. the combustion chamber wall composed of several parts consists throughout of the same material. The combustion chamber 56 is enclosed by the elastic filler 70, the filter 76, the cap 60 and the closing member 80. As stated before, all these components preferably consist of the same metal, preferred of the same steel.

The discharge orifices 78 are closed prior to activation of the inflator 10 by a tamping 84 in the form of a tamping film. The tamping 84 is disposed circumferentially at the inside of the circumferential wall 16 of the diffuser 14 at the height of the discharge orifices 78 and covers all discharge orifices 78. The height of tamping 84 is approximately four times the diameter of the discharge orifices 78 in this case.

The lower end of the tamping 84, viz. the end facing the closing member 18, is arranged at a distance from the weld 22 which connects the diffuser 14 to the closing member 18. The distance a from the weld 22, or in this case equivalent to the end of the upper edge 20 of the closing member 18, in the shown case amounts to approx. 5.5 mm and preferably ranges from 3 to 7 mm (cf. FIG. 1). This distance is sufficient to prevent undesired heat transfer to the tamping 84 during welding.

The external housing 12 of the inflator 10 has a relatively thin wall thickness which in the example shown here nowhere is more than 2 mm. In particular, the wall thickness of the diffuser is 1.5 mm and that of the closing member is 1.9 mm. These wall thicknesses are sufficient to withstand a combustion chamber pressure of 300 bars upon activation of the inflator 10.

The diffuser 14 and the closing member 18 are connected only through the weld 22 so that said weld 22 forms the only connection between the components of the external housing 12 defining the strength. Preferably a tension rod is not provided.

In this case, the ratio of the maximum combustion chamber pressure to the wall thickness preferably is between 150 and 220 bars/mm.

The ratio of the entire discharge area of the inflator 10, viz. the sum of the areas of all discharge orifices 78, to the wall thickness is more than 30, especially more than 34 mm, in this case.

The ratio of the diameter D of the diffuser, measured by the diameter of the circumferential wall 16, to the minimum wall thickness of the external housing is preferably less than 50 and preferably ranges from 35 to 45. The flange 24 is not taken into account when determining the diameter.

The inflator 10 has substantially the shape of a flat cylinder, the ratio of the diameter D to the maximum axial height H being approx. 1.8±0.2, preferably 1.8±0.1.

Figure 4A:
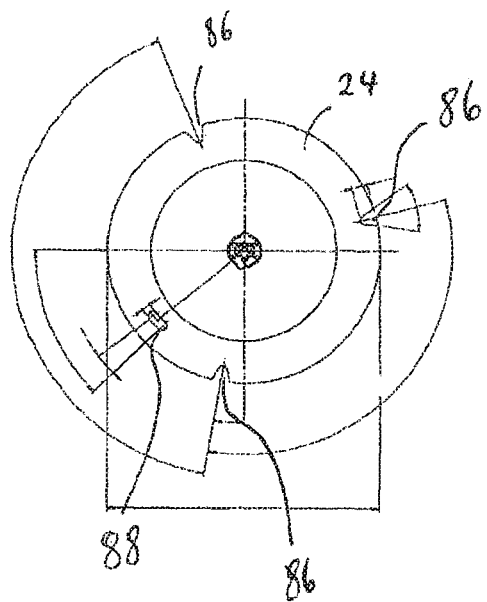
FIG. 4a is a schematic plan view of the flange of an inflator according to the invention.
Figure 4B:
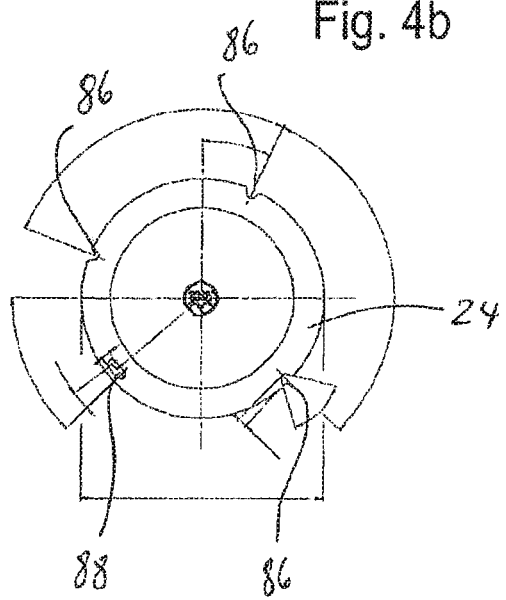

The flange 24 at the outer circumference of the diffuser 14 is planar but unsymmetrical (cf. FIGS. 4a and b). This design offers a positioning aid when mounting the inflator 10 into a module, for instance an airbag module, by clearly defining the mounting position.

In the present example three notches are spaced along the circumference of the flange 24 as mounting positioning means 86, namely at different angular distances. The angles between the notches amount, for instance, to 115 and 148° or to 93 and 109° in a different example.

As an additional or alternative mounting positioning means an orifice 88 is formed as oblong hole in the flange 84. This orifice 88 is the only orifice provided in the flange 84.

As a matter of course, also more or fewer notches 86 or projections instead of the notches or other suitable mounting positioning means 86 can be provided.

Figure 5:
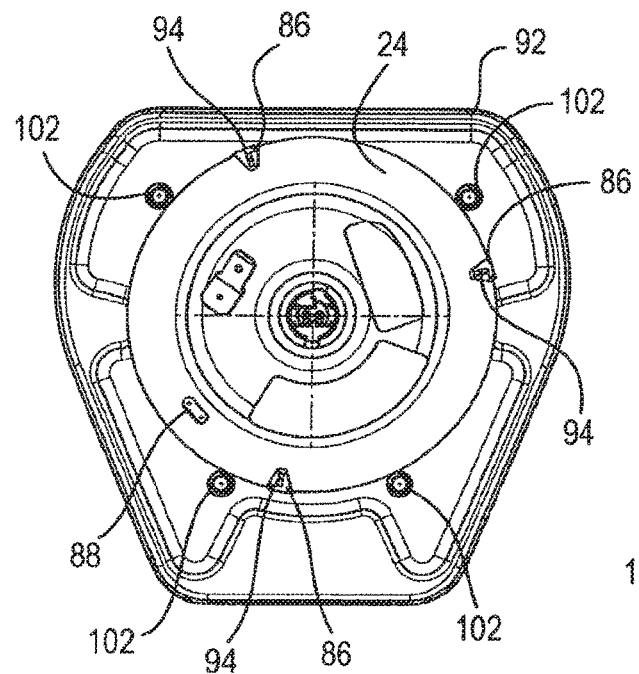
FIGS. 5 and 6 show schematic perspective views of an airbag supporting sheet of a module according to the invention, especially an airbag module, comprising a mounted inflator according to the invention.
Figure 6:
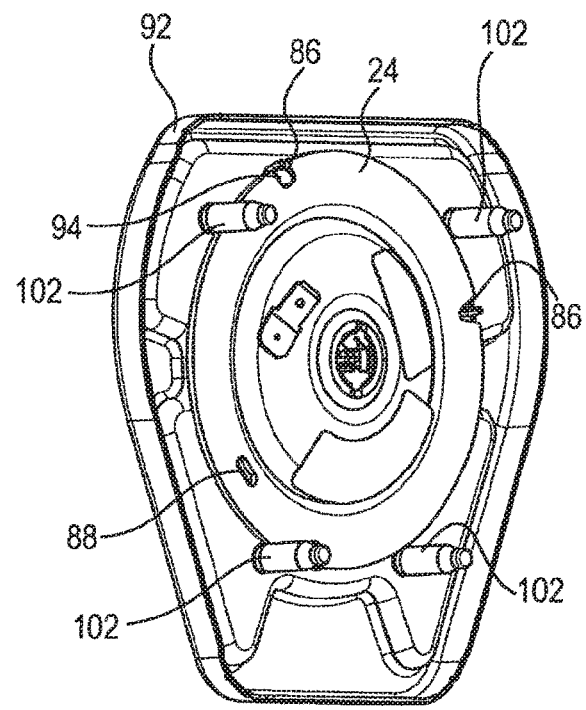
Figure 7:
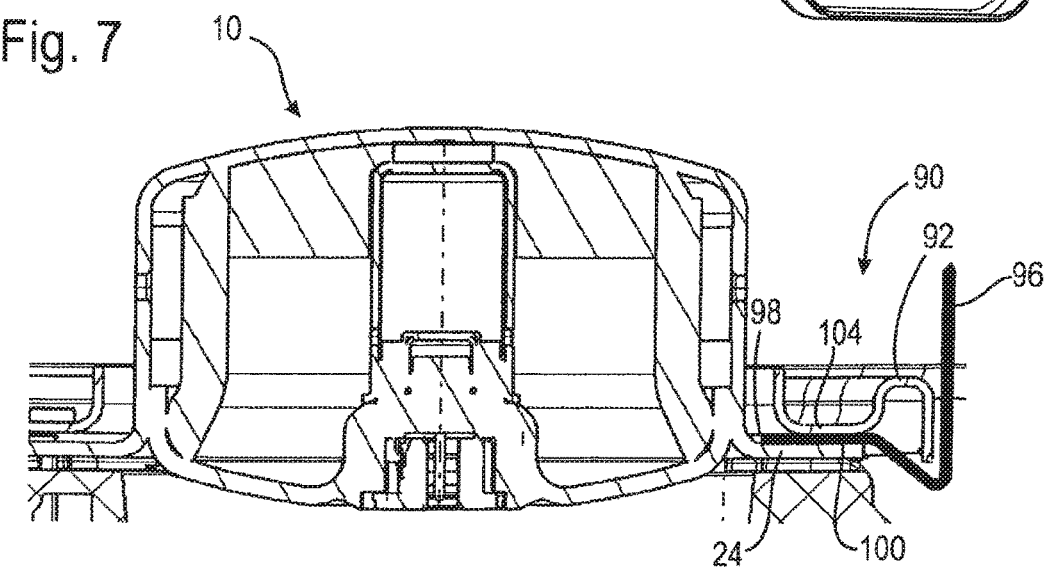
FIG. 7 is a schematic cross-sectional view of an airbag module according to the invention comprising an inflator according to the invention.
Figure 8:
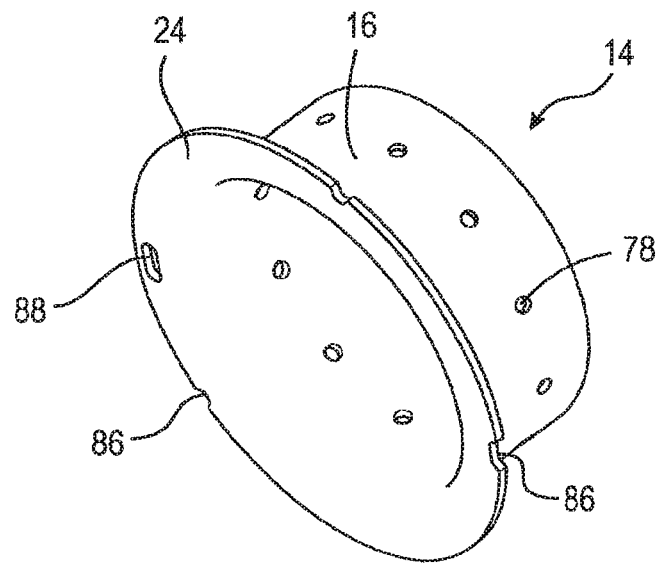
FIG. 8 is a schematic perspective representation of a diffuser of an inflator according to the invention.

When mounting the inflator 10 into a module, for instance an airbag module 90 shown in FIG. 7, the inflator 10 is fastened by a clamping or holding element 92 (cf. also FIGS. 5 to 7). The holding element 92 has a central opening through which the inflator 10 partly extends so that the holding element 92 presses against the flange 24. The holding element 92 includes corresponding mounting positioning means 94 which are complementary to the mounting positioning means 86 of the flange 24 of the inflator 10. In this case, the mounting positioning means 94 are formed by integrally provided projections in the holding element 92, for instance in the form of cut-out and upwardly bent sheet sections. The projections engage in the notches and thus clearly define the mounting position of the inflator 10.

The orifice 88 in the flange 24 serves for defining the mounting position of an airbag 96 (indicated in FIG. 7) which is clamped between the flange 24 and the holding element 92 by the orifice edge 100 of its injecting orifice 98.

The oblong hole 88 moreover can also be used for manufacturing the inflator. In particular, in different manufacturing steps the correct position of the diffuser (flange) with respect to other inflator components can be ensured by a pin in the tool head which is adapted to be engaged with the oblong hole, e.g. for orientation of the igniter pins.

The airbag 96 likewise has an orifice at the orifice edge 100 (not shown) which is made to match with the orifice 88 in the flange in order to correctly position the airbag 96. The orifice 88 does not serve as screwing orifice and constitutes the only orifice at the orifice edge 100 of the airbag 96. This means that the airbag 96 is clamped between the flange 24 and the holding element 92 by fastening means, usually stud bolts, which are located outside the flange 24. Thus the flange surface is optimized.

For fastening the airbag module 90 the holding element 92 includes fastening bolts 102, four of them in the shown example, through which the airbag module 90 can be connected to a vehicle (not shown). The fastening bolts 102 are adjacent to the outer circumference of the flange 24 but offside the area of the mounting positioning means 86.

The flange 24 is circumferential and planar.

It forms an annular clamping surface for the airbag 96, wherein the width B of the flange (the transition radius between the planar flange portion and the circumferential wall of the diffuser 14) is between 5 and 12%, preferably between 8 and 11% of the maximum diameter D of the external housing 12.

Figure 9:
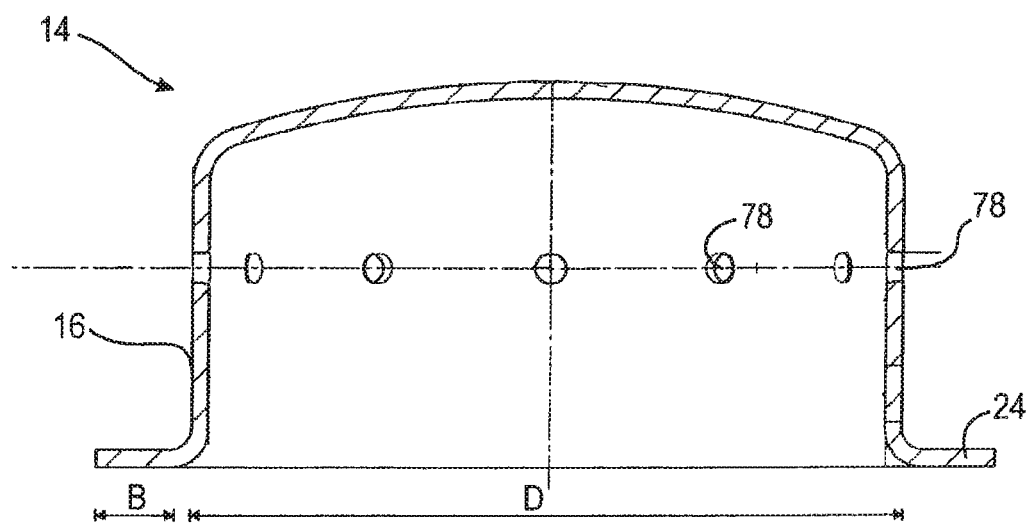
FIG. 9 is a schematic sectional view of the diffuser shown in FIG. 8.

The width B of the clamping surface in the radial direction r ranges from 5 to 8.5, preferably from 5.5 to 7.5 mm (cf. FIG. 9).

At the holding element 92 opposed to the clamping surface a clamping portion 104 is defined at the flange 24 (cf. FIG. 7), which clamping portion produces a holding force for the airbag 96 together with the clamping surface at the flange 24. The clamping surface and the clamping portion 104 are designed such that the forces acting via the maximum internal pressure in the airbag 96 on the orifice edge 100 are by 20 to 50% less than the clamping force produced between the clamping surface and the clamping element 104. The width B of the flange 24 can be considerably reduced, so-to-speak to the minimum flange width, by this very simple measure.

Figure 10:
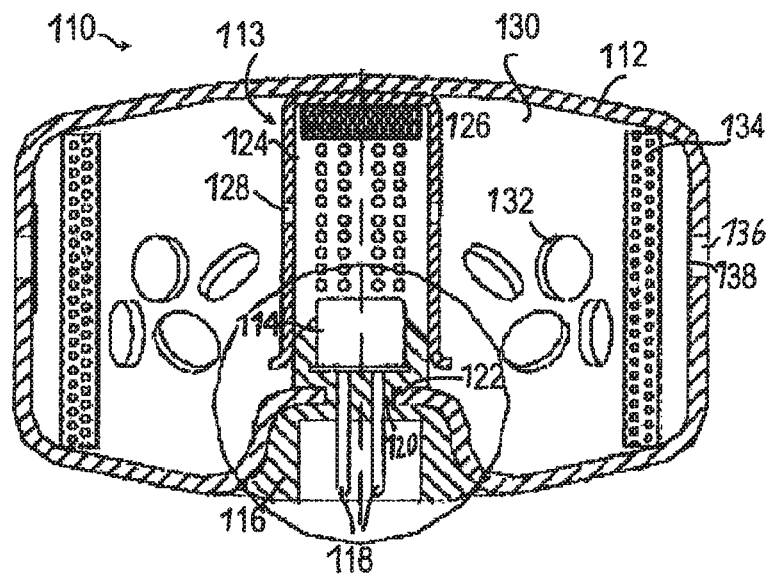
FIG. 10 is a sectional view of an inflator according to the invention.
Figure 11:
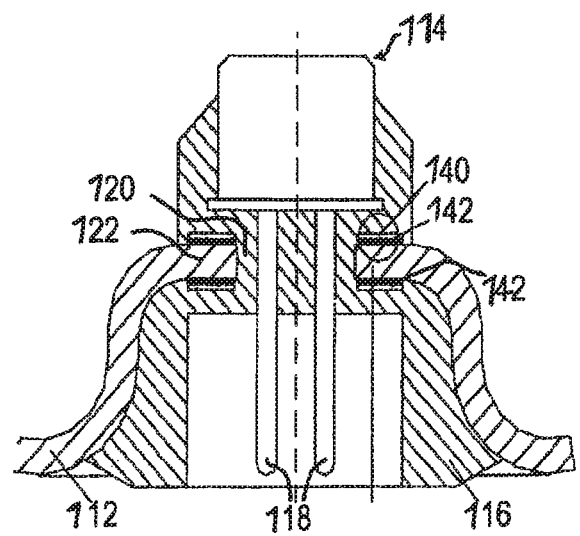
FIG. 11 is an enlarged detail of FIG. 10 showing the connection of a first and a second component.

FIG. 10 shows a special embodiment of an inflator 110 according to the invention which exhibits a first component 112, here made of metal, in the form of an inflator housing in which an igniter device 113 is centrally disposed. The latter comprises an igniter constituting a second component 114 which is connected to the first component 112 via an injection-molded plastic base 116 by the fact that both components are at least partly jointly surrounded by injection-molding. The igniter in this case is a pre-fabricated component enclosed by a metallic outer shell and includes plural connecting wires 118 partly embedded in the plastic base 116 which project through an orifice 120 in the first component 112 (the inflator housing) from the latter. The orifice 120 simultaneously serves for receiving and fastening the second component 114 (of the igniter), wherein especially the portion of the first component 112 forming the edge 122 of the orifice 120 is embedded in the plastic base 116 during injection-molding.

The upper end of the igniter in FIG. 10 is adjacent to a booster chamber 124 filled with a boosting charge. In the shown configuration a sleeve 126 confining the booster chamber 124 and having plural overflow orifices 128 is placed onto the igniter or the plastic base 116. The booster chamber 124 is surrounded by a combustion chamber 130 which is filled with a schematically illustrated propellant 132 in the form of tablets and at the outside is adjacent to a filter 134. At its circumferential wall, the inflator housing has discharge orifices 136 which in the mounted state are protected against penetration of moisture by a tamping film 138. Upon activation of the inflator 110, a gas is generated in a known way which flows to the outside through the discharge orifices 136 and serves, e.g., for filling an airbag of a vehicle occupant restraint system.

In the contacting area 140 located in the vicinity of the orifice 120 or the edge 122 between the plastic base 116 and the first component 112, the latter is provided with an adhesive film 142 which was applied already before injection-molding the plastic base 116. The adhesive film 142 only covers a portion of the injection-molded area of the first component 112. The adhesive film 142 is fully circumferential around the edge 122, however.

Figure 12:
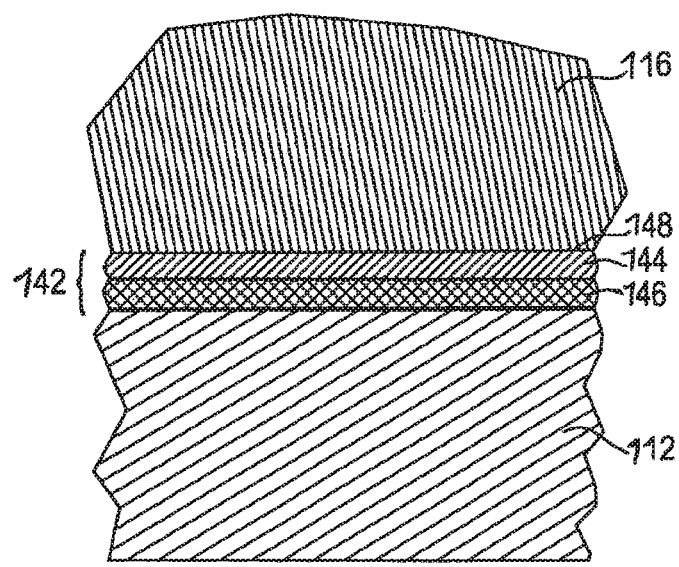
FIG. 12 is an enlarged illustration of the transition from the first to the second component.

The adhesive film 142 is a pre-fabricated component and consists of a plastic film 144 and an adhesive layer 146 directly and evenly applied thereto (cf. FIG. 12).

The material used for the plastic film 144 in this example is the same material as used for the plastic base 116. It is also possible, however, to use a different material which is suited for establishing a tight connection with the material of the plastic base 116. This can be a thermoplastic elastomer, for instance.

The adhesive film 142 serves as a bonding bridge between the plastic base 116 and the first component 112.

Deviating from the illustrated configuration, the surface of the adhesive film 142 can also extend over the entire injection-molded portion of the component 112 or project from the same, as a matter of course. It is also possible to provide an appropriate adhesive film also between the second component 114 and the plastic base 116.

The inflator 110 is manufactured as follows: To start with, the first component 112 (the inflator housing) as well as the second component 114 (the igniter) are provided and the first component 112 is provided with the adhesive film 124 in the later connecting area of the components (corresponding to the contacting area 140) by gluing one or more appropriately cut pieces of the adhesive film 142 with the adhesive layer 146 onto the corresponding positions of the first component 112, in this case on both sides in the area of the edge 122.

The adhesive of the adhesive layer 146 can be activated or hardened already now by the pressure during gluing. Alternatively, it is activated or hardened by heating, which is effectuated e.g. during injection-molding by the heat influence of the liquid plastic material.

After the adhesive film 142 was glued onto the first component 112, the second component 114 is positioned relative to the first component 112, and both components 112, 114 are jointly surrounded by injection-molded forming the plastic base 116, wherein both components 112, 114 are embedded at least partly in the plastic base 116.

During injection-molding the material of the plastic film 144 combines with the injected plastic material by the fact that a surface layer of the plastic film 144 melts in a connecting zone 148 with the plastic base 116. As an alternative, in the connecting zone 148 also a chemical reaction can take place between the material of the plastic film 144 and that of the plastic base 116, which reaction tightly and non-detachably interconnects the plastic film 144 and the plastic base.

The adhesive layer 146 forms a bonding bridge between the first component 112 and the plastic base 116, the bonding bridge being resilient and/or plastically deformable so that tensions and shear forces occurring due to different thermal expansion coefficients of the different materials are compensated. The adhesive layer 146 also acts as a packing between the first component 112 and the plastic base 116.

All described features can be combined with or exchanged for one another at the discretion of those skilled in the art.

Having described the invention, the following is claimed:

1. An inflator for a protective device in a vehicle, comprising:
   a housing comprising a combustion chamber filled at least partially with a pyrotechnic material;
   at least one igniter actuatable to ignite the pyrotechnic material;
   one or more overflow orifices through which the pyrotechnic material in the combustion chamber is ignited in response to actuation of the igniter, wherein the overflow orifices are movable relative to the igniter in response to actuating the igniter;
   a cap that defines an intermediate chamber and separates the intermediate chamber from the combustion chamber, wherein the overflow orifices extend through a wall of the cap, the intermediate chamber contains a boosting charge positioned adjacent the igniter, and the igniter is configured to ignite the boosting charge, the cap being configured to move in response to igniting the booster charge; and
   a base that fixes the igniter to the housing, wherein the cap includes an open end fitted onto the base.

2. The inflator recited in claim 1, wherein the cap and base are configured to position the overflow orifices at an upper edge of the base when the cap is pressed onto the base.

3. An inflator according to claim 1, wherein the cap is press-fitted onto the base, the cap being movable on the base in response to activating the igniter.

4. An inflator according to claim 1, further comprising an elastic component positioned adjacent a closed end of the cap, opposite the open end of the cap.

5. An inflator according to claim 4, wherein the elastic component is configured to support the cap prior to activation of the igniter and to be compressed by the cap when the cap moves in response to actuation of the igniter.

6. An inflator according to claim 4, wherein the elastic component comprises a mesh filter material.

7. An inflator according to claim 4, wherein the elastic component comprises a recess into which the cap projects.

8. An inflator according to claim 4, wherein the elastic component is positioned adjacent a closed end of the cap and an inside of an end face of the inflator.

9. The inflator recited in claim 8, wherein the end face of the inflator comprises a bulge that provides space into which the cap can move axially.

10. An inflator according to claim 1, wherein the base is formed by injection-molding around the igniter and fixes the igniter to the inflator.

11. An inflator according to claim 1, wherein the cap forms the only partition between the intermediate chamber and the combustion chamber.

12. An inflator according to claim 1, wherein the housing comprises an orifice that extends through the housing, the base comprising a molded material that extends through the orifice and at least partially surrounds the igniter to support the igniter on the housing, the base comprising an end portion that extends into the housing, wherein the cap is pressed onto the end portion of the base so that a sidewall of the cap engages the end portion and is secured to the base.

13. An inflator according to claim 12, wherein the housing comprises a recess and the orifice is positioned in the recess, wherein the recess comprises a sidewall with a radially outward bulge that is filled with the molded material of the base, which helps secure the base and the igniter in the recess.

14. An inflator according to claim 13, wherein the recess further comprises a convex projection in the form of a circumferential bead that extends around the edge of the orifice and adjacent the bulge, wherein the molded material of the base surrounds the bead.

15. An inflator according to claim 1, wherein the cap is configured to direct combustion products from the intermediate chamber through the overflow orifices along radial paths outward from the cap into the gas-generating material in the combustion chamber, wherein the movement of the cap along the end portion of the base in response to actuation of the igniter causes the overflow orifices to also move axially so that the radial paths of the combustion products move axially with the cap.

16. An inflator according to claim 1, wherein the cap is configured to move axially in response to the igniter igniting the boosting charge in the intermediate chamber.

17. An inflator according to claim 1, wherein the housing comprises a diffuser and a closing member, the closing member comprising a recess having an annular portion surrounding the orifice, wherein the base at least partially fills the recess.

18. An inflator according to claim 1, wherein the base leaves a portion of the igniter exposed to the boosting charge in the intermediate chamber.

19. An inflator according to claim 1, wherein the cap comprises a protective film that covers and closes the overflow orifices prior to actuation of the igniter.

20. An airbag module comprising:
- an inflator according to claim 1, wherein the inflator comprises an external housing having a peripheral flange;
- an airbag having an inlet orifice defined by an orifice edge; and
- a clamping element connectable with the flange for clamping the orifice edge of the airbag between the clamping element and the flange.

* * * * *